United States Patent
Bock et al.

Patent Number: 5,270,849
Date of Patent: Dec. 14, 1993

[54] PREVENTION OF STRAY LIGHT REFLECTIONS IN A RASTER OUTPUT SCANNER (ROS) USING AN OVERFILLED POLYGON DESIGN

[75] Inventors: Edward C. Bock, Webster; James J. Appel, Brighton, both of N.Y.

[73] Assignee: Xerox Corporation, Stamford, Conn.

[21] Appl. No.: 988,585

[22] Filed: Dec. 10, 1992

[51] Int. Cl.$^5$ .................................. G02B 26/08
[52] U.S. Cl. .......................... 359/206; 359/216
[58] Field of Search .................... 359/216-218, 359/206, 662; 250/205, 235-236; 346/108, 160; 358/206, 300, 302

[56] References Cited

U.S. PATENT DOCUMENTS

| | | | |
|---|---|---|---|
| 4,230,902 | 10/1980 | Hug et al. | 359/399 |
| 4,443,695 | 4/1984 | Kitamura | 250/205 |
| 4,941,721 | 7/1990 | Banton et al. | 350/6.8 |
| 5,151,586 | 9/1992 | Sato et al. | 250/205 |

*Primary Examiner*—Bruce Y. Arnold
*Assistant Examiner*—James Phan

[57] ABSTRACT

In an overfilled ROS polygon architecture, stray reflection from facets adjacent the completely filled (illuminated) facet are prevented from affecting the scan line images by aligning the optical axis of the pre-polygon and post-polygon optical components at an optimum angle $\phi'$ so that the stray light reflections at the photoreceptor occur only at non-image forming scan times (outside the image scan time). The optimum angle $\phi'$ is expressed by the relationship $\phi' = 2(\Omega \pm \frac{1}{2}\theta)$ where $\Omega$ is given by the expression $360/X$, X being the number of scanning facets, and $\theta$ being the scanning angle.

5 Claims, 2 Drawing Sheets

PREVENTION OF STRAY LIGHT REFLECTIONS IN A RASTER OUTPUT SCANNER (ROS) USING AN OVERFILLED POLYGON DESIGN

The invention relates to a raster output scanning system (ROS) and, more particularly, to an improved optical system for preventing stray light reflections from being imaged onto a light sensitive medium when using an overfilled Raster Output Scanner (ROS) design.

Digital printers incorporating Raster Output Scanners use a rotating polygon as the scanning element to form modulated scan lines on the surface of a photosensitive medium. In a typical system, a beam, modulated according to an input video signal, is emitted from a light source such as a helium neon or a diode laser. The modulated light is directed through pre-polygon conditioning optics, onto the facets of a rotating polygon. The polygon rotates in the 3 to 30 krpm range, then scans the beam through a post-polygon optical system and images the laser spot as a scan line across the full process width of a photosensitive medium moving in a process direction. In prior ROS systems there are typically three scanning modes. In a first mode, pre-polygon conditioning optics incorporate an underfilled design; e.g. the light from the laser is either collimated, in the case of a diode laser, or expanded, in the case of a gas laser, and collimated to the correct beam width in the fast scan direction on an imaging polygon facet that is smaller than the facet, typically by a factor of approximately 3. The underfilled design has been generally preferred because of a high throughput efficiency and uniform illumination of the imaging facet. A second mode is the overfilled design where the light beam is collimated in the case of a diode laser, or expanded in the case of a gas laser, to the correct beam width in the fast scan direction on the imaging polygon facet that is larger than the facet by a factor of 3 or so in the fast scan direction. In an overfilled design the requirement for facet size required to produce a given spot size at the image medium is greatly reduced allowing many more facets to be accommodated on the same diameter polygon. This, in turn, permits the scan system to form more scan lines per second with a given polygon motor, or, alternatively, to permit the use of less powerful and less expensive polygon motor drives. The overfilled design has several disadvantages which have heretofore not been completely resolved. The throughput efficiency is relatively low (20%) compared to the 50% efficiency of the underfilled design and the illumination of the imaging facet is not as uniform as the underfilled design. This illumination problem, however, has been addressed by the techniques disclosed in U.S. Pat. No. 4,941,721. A third mode is where the facet is exactly illuminated by the exposure beam. To enable this mode, a relatively costly and complex facet tracking apparatus must be provided to displace the beam in the direction of rotation of the facet, so that the illumination beam moves in synchronism with the facet.

The overfilled design, in addition to the disadvantages mentioned above, also has a significant problem in the stray reflection of light from facets that are adjacent the facet that is being fully illuminated to form the scan line at the photosensitive medium. This stray reflected light is reflected back though the pre-polygon optical system where the light either enters the laser by passing through the partially transmitted, partially reflective, front surface of the laser or it undergoes another reflection, this time from the partially reflective diode laser front surface. If it enters the laser cavity, it can cause the laser output to become unstable. If it is reflected back through the polygon optical system back onto the imaging facet and then reflected through the post-polygon optical system where it is incident on the image plane, it can form an undesirable light image.

According to the present invention, the optical axis of the light beams in the pre-polygon optical system is aligned at some optimum angle $\phi$ with the optical axis of the post-polygon optical system, so that the stray light reaches the photoreceptor only at times which are outside the time during which the scan line is being swept across the photoreceptor surface. More particularly, the present invention relates to an optical scanning system which compensates for unwanted stray light reflections in an overfilled polygon design comprising:

a pre-polygon optical system having optical components aligned along a first optical axis, said pre-polygon optical system including:

a source of high intensity modulated, polarized, collimated light beams, means to focus the collimated beams in one direction, a polygon scanner having X number of light reflecting facets interposed in the optical path between said pre-polygon optical system and a light sensitive medium, said facets being fully illuminated by incident light to produce scanning beams at some scan angle $\theta$ which are reflected towards the light sensitive medium while adjacent facets are at least partially illuminated and reflect at least a portion of the light incident normally thereon as a stray light beam in a reverse direction along said optical path, and a post-polygon optical system having optical components aligned along a second optical axis, and including at least an f$\theta$ lens to form an image line exposure of beams reflected from said scanning facets onto a light sensitive medium, and wherein said first and second optical axis are aligned with respect to each other at an angle $\phi$ given by the expression:

$$\Phi' = 2\left(\Omega \pm \frac{1}{2}\theta\right)$$

where $\Omega = 360/X$.

DESCRIPTION OF THE INVENTION

Figure 1:
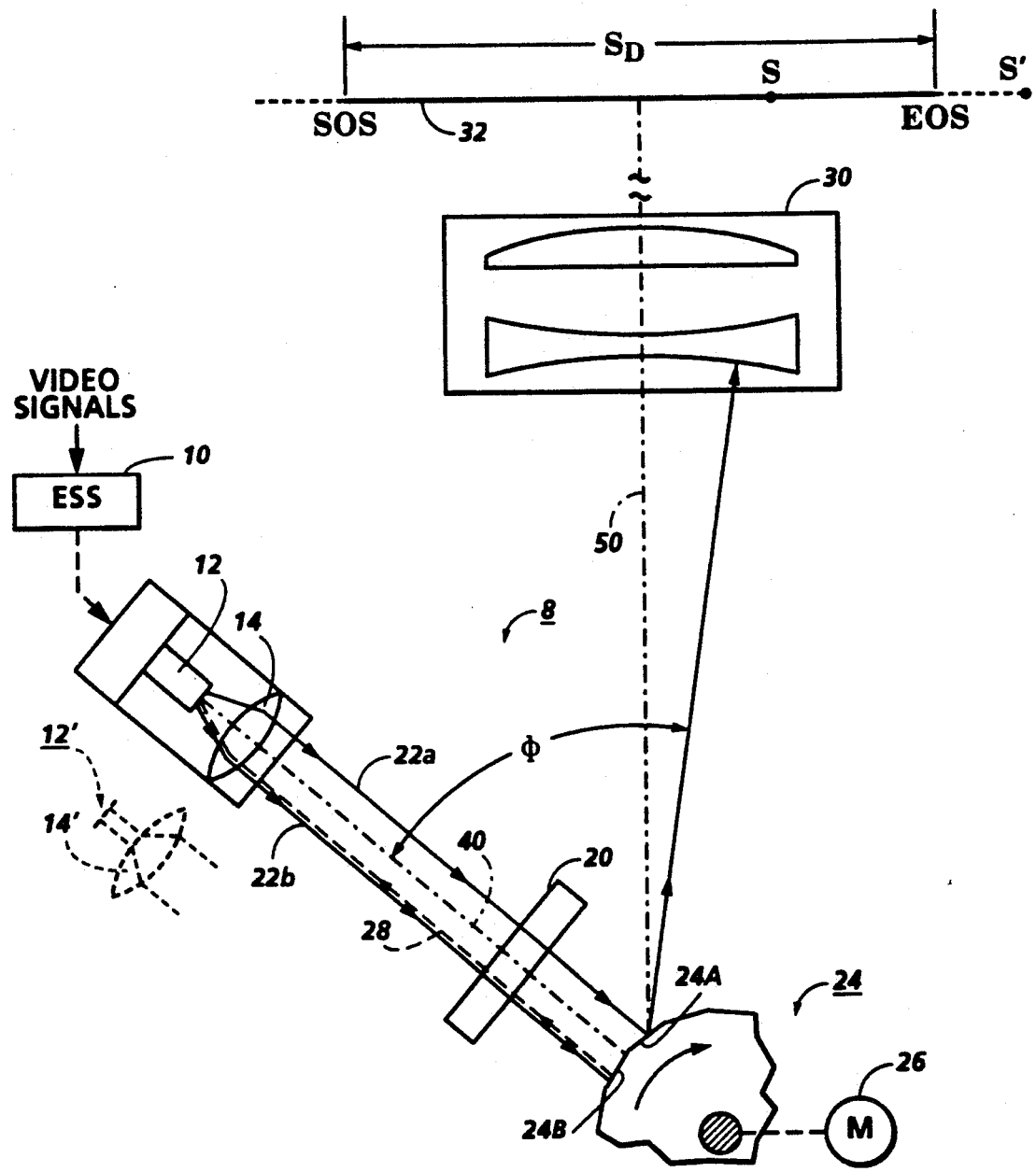
FIG. 1 shows a prior art, overfilled polygon ROS design illustrating the stray light problem.

Referring to FIG. 1, there is shown a ROS system 8, having an overfilled polygon facet design. A laser diode 12 serves as the source of high intensity collimated, polarized radiation. Video signals are input into an Electronic Sub System (ESS) 10 and applied to self-modulating laser diode 12. The output beam of light is modulated in conformance with the information contained in the video signal. The modulated beam is collimated by collimator assembly 14. Alternately, as shown in dotted form in FIG. 1, a gas laser 12' can be used, which produces a nearly collimated output, but requires beam expansion performed by beam expansion optics 14'. The gas laser output may be linearly polarized or randomly polarized. With either embodiment, the collimated light bundle has a width in the scan direction, which will overfill facets 24A and 24B. Rays 22a and b represent this overfilled image beam. Rays 22a and b pass through cylinder lens 20. Lens 20 shapes the collimated input beam to make it optically correct to compensate for motor polygon induced sagittal beam position (wobble) error. Diode 12, collimator 14 and lens 20 form a pre-polygon optical system. The lens creates a focused beam in the plane of the vertical axis at the polygon, while maintaining the collimation of the beam in the perpendicular or scanning axis. Thus, a collimated light beam is directed across facets 24A, 24B of polygon 24, being rotated by a polygon motor 26. Facet 24A is shown for illustrative purposes as the imaging facet, while facet 24B is an adjacent facet. As the polygon rotates, a portion of the incident light becomes normally incident to adjacent facet 24B at some rotation angle. Light is reflected back along the optical path, as represented by a stray light reflected beam 28, shown as a dashed line. This beam passes through lens 20 and collimator assembly 14 and converges onto the reflective front surface of diode 12 or the front mirror or a gas laser. The beam is then partially reflected back along the pre-polygon optical path to scanning facet 24, and partially transmitted through the front surface of diode 12 or the gas laser mirror. Light reflected from the diode front surface, or the gas laser front mirror and facet 24A is scanned through a post-polygon optical system which includes fθ imaging lens 30. Lens 30 is designed to provide a linear relationship between the rotation of polygon 24 and the deflection of the scanned beam in the transverse direction at the photoreceptor surface 32. The modulated beam forms an image line exposure at photoreceptor surface 32, which would also include an unwanted spot of illuminations caused by the reflection of the stray light beam. In addition, the reflected light reaching the laser diode facet or gas laser front mirror can pass through the facet or front mirror and cause the laser diode or gas laser output to become unstable.

As shown in FIG. 1, the optical axis 40 of the pre-polygon optical system including diode laser 12, beam collimator 14 and lens 20, are aligned with respect to the optical axis 50 of the post-polygon optical system including the fθ lens 30, by an angle $\phi$. This angle, in the prior art, has been determined by minimizing spot width variation across the scan line. It has been determined, however, that there is an optimum angle $\phi'$, which will prevent the rays striking adjacent facets, such as 24B, from being normally incident during the scanning of the photoreceptor by the scanning facet 24A. The beam will be incident at a non-normal angle, such that the unwanted stray light beam S is formed as beam S' at some point outside the image scan line width $S_D$, at a point in time $T_1$. This angle is based on a relationship determined between the facet angle $\Omega$ and the facet scan angle $\theta$ given by the expression:

$$\Phi = 2\left(\Omega \pm \frac{1}{2}\theta\right) \quad (1)$$

where $\Omega$, the facet angle, equals 360/X where X is the number of facets and $\theta$ is the angle required for the facet to scan the image zone.

Figure 2:
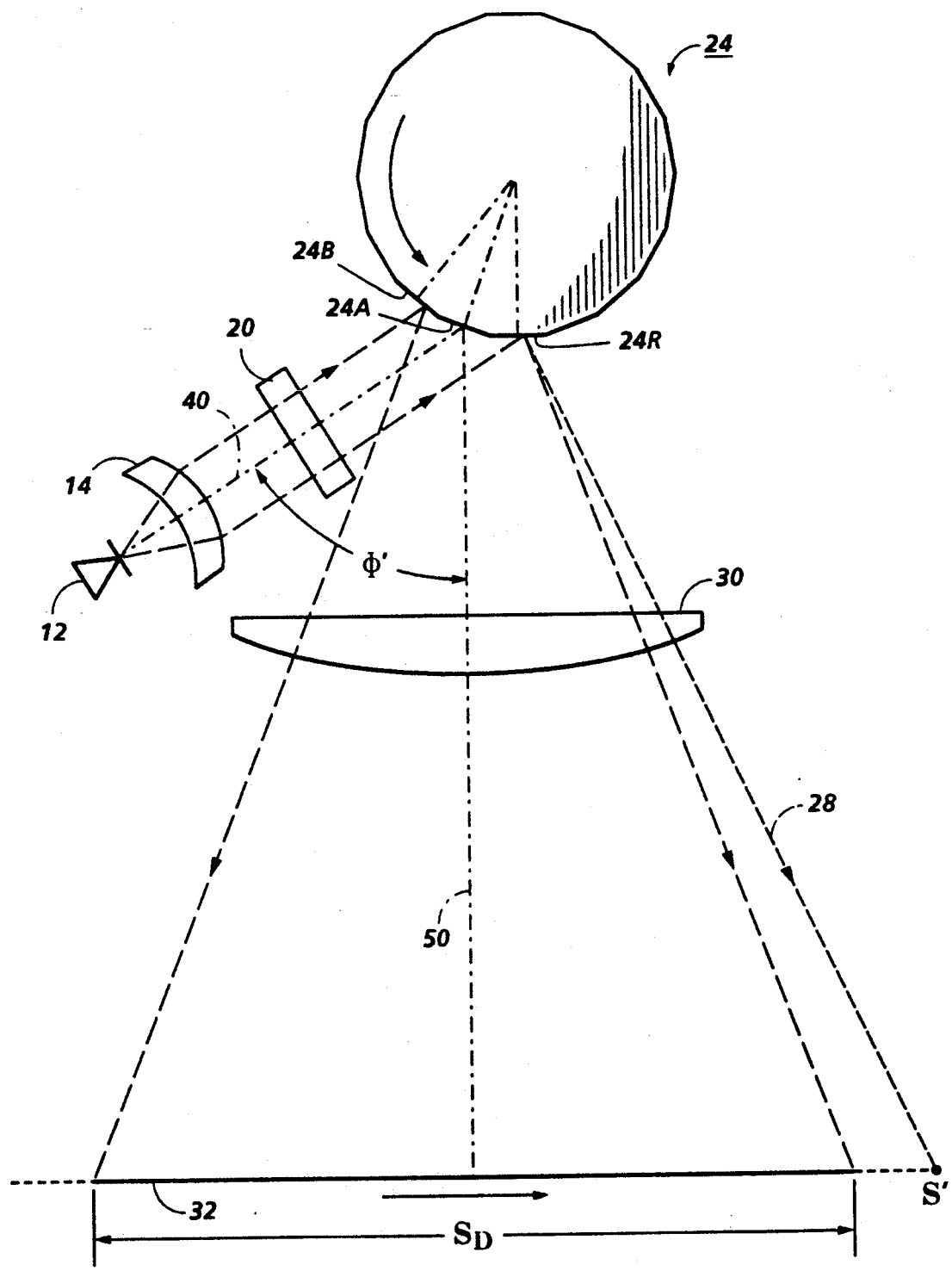
FIG. 2 shows the design of FIG. 1 with an example of a preferred angle $\phi$ formed by the optical axis of the pre-polygon and post-polygon optical systems.

FIG. 2 illustrates a ROS system with a polygon 24 having 18 facets 24A–24R. As in the prior art embodiment shown in FIG. 1, the output of diode 12 is expanded by beam expansion optics 14 and focused by lens 20 in the plane of the vertical axis at the polygon. Also, as shown in FIG. 1, an fθ lens 30 focuses beams reflected from the polygon onto the surface 32. The polygon rotates through an angle $\theta$ of 17.5° to form a 12.5" image line of width $S_D$. For this example, $\phi' = 2(360 \div 18 \pm 17.5 \div 2)$ or $\phi' = 57.5°$. The center lines 40 and 50 are thus aligned at this angle with respect to each other. The reflected beams 28 from the diode are now reflected from the previous imaging facet 24R and reach the photoreceptor as beam S', at some point outside the image scan line $S_D$.

The above calculation of angle $\theta$ insures that almost all of the stray light instantaneously reflected from adjacent facets will be reflected outside the imaging zone $S_D$. For some systems employing single or multiple laser diodes, an additional calculation may be needed to take into account the reflections of the stray light spots from the face of the diode chip or chips in the fast scan direction, as seen through a small rotation of the polygon. The rotation is an angle given by the expression $(\tan^{-1}.W/FL)/2$, where W is the furthest distance from the pre-polygon optical axis of a reflecting portion of a diode chip, in millimeters, of the diode chip in the fast scan direction and FL is the focal length of collimator 20. Thus, for a fully compensated system:

$$\Phi' = 2\left(\Omega \pm \frac{1}{2}\theta\right) + \frac{1}{2}\left[\tan^{-1}\left(\frac{W}{FL}\right)\right] \quad (2)$$

This additional polygon rotation angle is quite small for a single diode, but may become significant when multiple diodes are butted together in the fast scan direction. As an example, for a single diode formed with a W of 0.1 mm and a collimator with an FL of 40 mm, a value of 0.14° added to the earlier derived 57.5° for a total value of $\phi'$ of 57.64°.

According to a further aspect of the invention, the position of beam S', and the time $T_1$, at which S' is formed, is important when a back facet detector is used in the design, to measure the diode laser output level. As is conventional in the art, this detector is enabled at a time after the end of scan and before the start of scan. At these times, the laser is normally turned on and kept on at full power so detection can be made of the laser output levels, and adjustments made if necessary. However, because of the presence of spot S' during the time that this detection takes place, the detector would not present an accurate measurement of the output. According to a further aspect of the invention, the detection of the diode laser output level is delayed until the polygon has swept through the angle $\phi'$, so that the back reflected beam is no longer incident upon the diode chip.

While the invention has been described with reference to the structures disclosed, it is not confined to the details set forth, but is intended to cover such modifications or changes as they come within the scope of the following claims.

We claim:

1. An optical scanning system which compensates for unwanted stray light reflections in an overfilled polygon design comprising:
   a pre-polygon optical system having optical components aligned along a first optical axis, said pre-polygon optical system including:
   a source of high intensity modulated, collimated light beams, and
   means to focus the collimated beams in one direction;
   a polygon scanner having X number of light reflecting facets interposed in an optical path between said pre-polygon optical system and a light sensitive medium, said facets being fully illuminated by incident light to produce scanning beams at some scan angle $\theta$ which are reflected towards the light sensitive medium while adjacent facets are at least partially illuminated and reflect at least a portion of the light incident normally thereon as a stray light beam in a reverse direction along said optical path, and
   a post-polygon optical system having optical components aligned along a second optical axis, and including at least an $f\theta$ lens to form an image line exposure of beams reflected from said scanning facets onto a light sensitive medium, and wherein said first and second optical axes are aligned with respect to each other at an angle $\phi'$ given by the expression:

$$\phi' = 2(\Omega \pm \tfrac{1}{2}\theta)$$

where $\Omega = 360/X$.

2. The scanning system of claim 1 wherein said source of light beams includes a diode laser having a high intensity light beam output and a collimating lens for collimating the light beam output of said laser.

3. The scanning system of claim 2 wherein the diode laser has a front reflecting surface width W, expressed in millimeters in a fast scan direction and wherein said collimator lens has a focal length FL and wherein said scan angle $\phi'$ is given by the expression:

$$\Phi' = 2\left(\Omega \pm \tfrac{1}{2}\theta\right) + \tfrac{1}{2}\left[\tan^{-1}\left(\frac{W}{FL}\right)\right]$$

4. The scanning system of claim 1 wherein said source of light beams includes a gas laser having a high intensity light beam output and beam expansion means for expanding the light beam output of said laser.

5. The scanning system of claim 1 further wherein said image line exposure is formed along a scan line having a distance $S_D$ and wherein said stray light is formed as a stray light beam $S'$ outside of said distance $S_D$.

* * * * *